US012789488B2

(12) United States Patent
Jeong et al.

(10) Patent No.: US 12,789,488 B2
(45) Date of Patent: Nov. 10, 2026

(54) HIDDEN LIGHTING FILM LENS FORMATION APPARATUS AND HIDDEN LIGHTING FILM LENS

(71) Applicants: HYUNDAI MOTOR COMPANY, Seoul (KR); KIA CORPORATION, Seoul (KR)

(72) Inventors: Da-Young Jeong, Seongnam-si (KR); Seung-Pyo Hong, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 251 days.

(21) Appl. No.: 18/511,342

(22) Filed: Nov. 16, 2023

(65) Prior Publication Data

US 2024/0165900 A1 May 23, 2024

(30) Foreign Application Priority Data

Nov. 17, 2022 (KR) ........................ 10-2022-0154353

(51) Int. Cl.
*B29D 11/00* (2006.01)

(52) U.S. Cl.
CPC .... *B29D 11/00432* (2013.01); *B29D 11/0049* (2013.01); *B29D 11/005* (2013.01)

(58) Field of Classification Search
CPC .......... B29D 11/00432; B29D 11/0049; B29D 11/005
See application file for complete search history.

(56) References Cited

FOREIGN PATENT DOCUMENTS

| | | | |
|---|---|---|---|
| JP | 2005-74743 | * | 3/2005 |
| JP | 2020-32554 | * | 3/2020 |
| KR | 20050014306 A | | 2/2005 |
| KR | 10-02005-0081142 | * | 8/2005 |

* cited by examiner

*Primary Examiner* — Mathieu D Vargot
(74) *Attorney, Agent, or Firm* — Lempia Summerfield Katz LLC

(57) ABSTRACT

Proposed is a hidden lighting lens formation apparatus. In a film formation process, a transmissivity-adjustable film having a flange whose rear surface is fixed to a top portion overlapping a lens hidden lighting section, an end portion of a both-end portion rear surface, and a fixation hole is manufactured. In an injection formation process, the film is fixed with a cavity sidewall, a film insertion portion, and a protrusion in a cavity in a mold. A lens and a bezel are formed by injecting resin through injection molding. As a result, the film absorbs film-forming dispersion for high-frequency formation. Additionally, when a lens, together with the film, is formed through insertion injection, a desired pattern can be formed without causing an inconsistent shape of an end portion of the film in the cavity in the mold and pushing the end portion of the film.

10 Claims, 8 Drawing Sheets

<STRUCTURE OF CORE/CAVITY FORMING FIML LENS OF UNIFORM THICKNESS>

<EXAMLE OF CALCULATING REQUIRED PLANE DISTANCE>

<SECONDARY RESIN INJECTION (BLACK)>

<SECONDARY RESIN INJECTION FOR CONCAVE SHAPE (BLACK)>

<SECONDARY RESIN INJECTION FOR CONVEX SHAPE>

<SEPARATE GARNISH>

<PAINT APPLICATION>

HIDDEN LIGHTING FILM LENS FORMATION APPARATUS AND HIDDEN LIGHTING FILM LENS

CROSS-REFERENCE TO RELATED APPLICATION

This application claims the benefit of and priority to Korean Patent Application No. 10-2022-0154353, filed on Nov. 17, 2022, which is incorporated herein by reference in its entirety.

BACKGROUND

Field of the Disclosure

The present disclosure relates to a hidden lighting film lens and an apparatus for manufacturing the hidden lighting film lens.

Description of Related Art

In general, vehicular hidden lighting refers to a lamp whose external appearance or internal shape remains hidden when not turned on. To this end, the vehicular hidden lighting has the same shape as a surrounding component or takes the form of a garnish. An optical system for realizing hidden lighting is used for the vehicular hidden lighting.

Specifically, the optical system for realizing hidden lighting is manufactured using one of evaporation perforation techniques, opaque deposition techniques, and film insertion lens techniques.

As an example, the deposition perforation technique uses a lens injection process, an internal deposition, and a laser perforation process in this sequence, and thus the deposition perforation technique has the advantage of realizing various images according to a process pattern. However, it is impossible to realize color with techniques other than deposition, and there are limitations to the shape that can be created with laser perforation. The opaque deposition technique uses a lens injection process and an internal deposition process in this sequence, and thus the opaque deposition technique has the advantage of accommodating large sizes and eliminating the need for laser perforation. However, it is difficult to control transmissivity (i.e., a measure of the capacity of a material to transmit radiation, such as light) due to variability in thickness (i.e., the thickness of the material is not consistent or fixed, but varies from one point to another).

Particularly, in the deposition perforation technique, it is difficult to realize uniform patterns with respect to lens curvature that exceeds a laser focus region during the manufacturing process. Additionally, a laser perforation region is greatly limited. In the opaque deposition technique, varying transmissivity caused by differences in opaque deposition distances during the manufacturing process limits the ability to change a dipole angle. Additionally, a problem arises in that variations in transmissivity occur on a per-lens basis or on a per-lens section basis.

The film insertion lens technique uses a film forming process and an insertion lens injection process in this sequence and does not have limitations in pattern, shape, and thickness variation.

Therefore, the film insertion lens technique has the advantage of eliminating the limitations of the deposition perforation technique and the opaque deposition technique.

However, in the film insertion lens technique, a lens, together with a film, is formed within a mold, thereby causing a problem in that the mold for the optical system for realizing hidden lighting is difficult to manufacture.

An example of the problem is that an end portion of a film inside a cavity in a mold has an inconsistent shape. This occurs because a film is manufactured using high-frequency formation (i.e., flex metal molding), a process that has difficulty in solving film-forming dispersion.

Another example of the problem concerns maintaining a regular position of the film within the cavity within the mold. This issue occurs because resin for forming a lens is injected into the cavity in the mold under resin injection pressure that can push an end portion of the film.

SUMMARY

An object of the present disclosure, which is contrived to address the above-mentioned problems, is to provide a hidden lighting lens formation apparatus and a hidden lighting film lens. The apparatus and the lens are capable of forming a desired pattern without causing an inconsistent shape of an end portion of a film in a cavity in a mold. Furthermore, the apparatus is cable of pushing the end portion of the film when the lens is formed through injection after the film is manufactured. This forming of the desired pattern is achieved by attaching a film fixation structure, together with the film for absorbing film-forming dispersion according to high-frequency formation, to the mold into which the film is inserted.

In order to accomplish the above-mentioned object, according to an aspect of the present disclosure a hidden lighting lens formation apparatus is provided to manufacture a hidden lighting film lens including a film for adjusting transmissivity. The apparatus includes a mold having a core, a cavity, and a first nozzle. The cavity aligns with a first surface of the core, forming a space to which a molten resin composition is injected such that a lens having a predetermined thickness is formed between the cavity and the core. The first nozzle is configured to inject the molten resin composition passing through the core. The cavity also includes a fixation portion for fixing a position of the inserted film.

In the hidden lighting lens formation apparatus, the fixation portion may be configured as at least one protrusion that protrudes from one surface of the cavity, in which the film is seated, and that is inserted into at least one hole formed in the film. Alternatively, the fixation portion may be configured as a film seating rib that is formed to protrude toward the core from the cavity in such a manner to laterally support both end portions of the film in a state where the film is inserted, and the film seating rib may protrude further toward the core than the film in the state where the film is inserted.

In the hidden lighting lens formation apparatus, the cavity may include a film insertion portion between the cavity sidewall and a cavity to form a cavity space. An end portion of the film is inserted into the film insertion portion when the film is inserted.

In the hidden lighting lens formation apparatus, the cavity may include: a cavity bottom portion on which the film is seated; and a cavity sidewall forming a periphery of the cavity bottom portion and surrounding a vicinity of the film when the film is seated on the cavity bottom portion. The cavity sidewall may be configured in such a manner as to have a greater height than an upper surface of the film, when viewed from the lateral surface, thereby forming a stepped shape between the cavity sidewall and the film.

In the hidden lighting lens formation apparatus, the core may further include: at least one second nozzle configured to inject opaque resin such as to form a bezel at a position where a surface of the lens corresponding to at least the fixation portion is covered when a state where the hidden lighting film lens is mounted to a vehicle is viewed from an outside.

In the hidden lighting lens formation apparatus, the hidden lighting film lens may include: a top portion: a convex ridge provided to both sides of the top portion; a vertical sidewall extending from the convex ridge; a concave ridge connected to the vertical sidewall; and a flange extending from the concave ridge. The cavity may have a shape that matches a shape of a hidden surface facing the film, the shape matching: the top portion, the convex ridge, the vertical sidewall, the concave ridge, and the flange of the hidden lighting film lens. When a state where the film is inserted into the cavity is viewed from the lateral surface, a distance between the vertical sidewall of the film and the protrusion on the film may be set to a value of a or higher that is calculated by the equation $a=R+\theta*\tan(H)$ (where R depicts a value of an inner radius of a convex ridge of the film, θ depicts a mold pulling angle (°), and H depicts a maximum height for film injection).

In the hidden lighting lens formation apparatus, the core and the cavity may be formed in such a manner that a value of R of an outer radius of the convex ridge of the hidden lighting film lens is equal to or greater than a value obtained by adding up a thickness of the lens in the top portion and a value of R of an inner radius of the convex ridge of the hidden lighting film lens.

In order to accomplish the above-mentioned object, according to another aspect of the present disclosure, there is provided a hidden lighting film lens that is obtained by pre-inserting a film for adjusting transmissivity into a mold and attaching the film to an upper end of a lens. The hidden lighting film lens includes a fixation-subject portion, when inserted into the mold, fixed by a fixation portion provided within a cavity in the mold.

The hidden lighting film lens may further include a bezel disposed on an outermost surface of the lens. The bezel is formed of opaque material in such a manner as to cover a surface of the hidden lighting film lens, corresponding to at least the fixation-subject portion, when a state where the hidden lighting film lens is mounted to a vehicle is viewed from an outside.

In the hidden lighting film lens, the bezel may be formed on a surface of the lens or a surface of the film by injection molding. The bezel may be formed by applying opaque paint on a surface of the lens or a surface of the film, and may be a garnish as a component configured separately from the lens.

In the hidden lighting film lens, the fixation-subject portion may be a hole into which a protrusion formed on the cavity is inserted. A portion of the bezel, which corresponds to the hole, may be formed by recessing the bezel inward. Alternatively, the portion of the bezel, which corresponds to the hole, may be formed to protrude through the hole.

In the hidden lighting film lens, the film may be configured with a plurality of layers, one of the plurality of layers may be formed of metalized polyethylene terephthalate (PET), which is necessary for achieving transmissivity deposition, blocking, color, and pattern to realize hidden lighting. A layer formed of polymethyl methacrylate (PMMA) having formability properties may be positioned on top of the layer formed of metalized PET. Additionally, a layer formed of hot melt film having adhesive properties may be positioned on the bottom of the layer formed of metalized PET. Furthermore, a thermoplastic polyurethane (TPU) film layer having properties suitable for high-frequency conduction formation may be positioned on the bottom of the layer formed of hot melt film, and a layer formed of Polyethylene Terephthalate Glycol-Modified (PET-G) for ensuring stiffness and maintaining a shape may be positioned on the bottom of the TPU film layer.

The hidden lighting lens formation apparatus according to the present disclosure, which is configured as described above, can increase a level of process simplicity and a degree of design freedom. The hidden lighting lens formation apparatus can also perform adjustments for uniform transmissivity, and can increase the likelihood of application.

The level of process simplicity is increased by a film insertion lens technique. Thus, a process other than injection is not necessary. Additionally, there is no need for costly apparatuses and machines, such as a laser perforator and an evaporator equipped with half-cut technology.

The degree of design freedom is increased by the use of the film, having a high degree of linear forming, which can be formed into various shapes for vehicular internal components. Unlike in an existing technique, an application section is not limited based on the size of the laser perforator. Additionally, design flexibility is not limited because it is not necessary to substantially increase a cross-sectional area when applying deposition to portions with varying curvature using the evaporator equipped with half-cut technology.

By adjusting for uniform transmissivity, uniform thickness and transmissivity for an insertion film lens can be ensured across all sections with varying curvature. Unlike in the existing technique, it is possible to eliminate non-uniformity in hole size and shape that results from two-dimensional laser perforation on a lens having portions with varying curvature. Additionally, it is possible to eliminate and reduce differences in deposition thickness on a per-section basis and a high degree of variation, respectively, which result from depositing in predetermined amounts a material onto portions of a half-mirror with varying curvature, which are set at predetermined distances from each other. Thus, uniform transmissivity can be ensured without any limitation.

The likelihood of application can be increased by various modifications, such as adjustments of color, a pattern, and a blocking region, which can be made to the film, thereby allowing for changes in the vehicle's visual appearance.

BRIEF DESCRIPTION OF THE DRAWINGS

These drawings are for reference only in describing embodiments of the present disclosure. Therefore, the technical idea of the present disclosure should not be limited to the accompanying drawings.

DETAILED DESCRIPTION

The embodiments of the present disclosure are described in detail below with reference to the accompanying drawings. The embodiments are exemplary and may be practiced in various forms by a person having ordinary skill in the art to which the present disclosure pertains. Therefore, the present disclosure is not limited to the embodiments described below.

When a component, device, element, or the like of the present disclosure is described as having a purpose or performing an operation, function, or the like, the component, device, or element should be considered herein as being "configured to" meet that purpose or to perform that operation or function.

Figure 1:
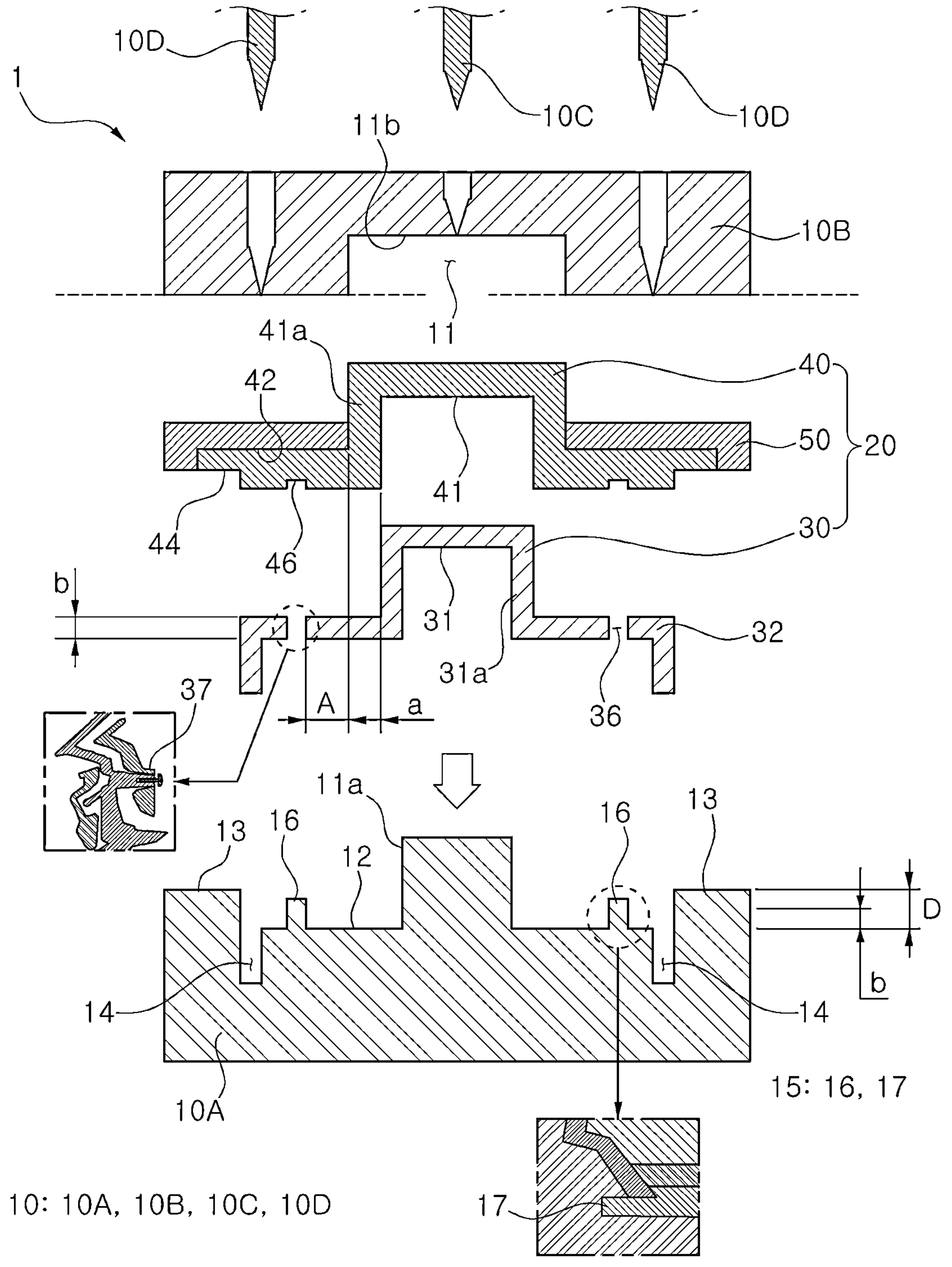
FIG. 1 is a view illustrating a configuration of a hidden lighting lens formation apparatus according to the present disclosure.

With reference to FIG. 1, a hidden lighting film lens 20 includes a film 30 capable of absorbing film-forming dispersion and adjusting transmissivity. The hidden lighting film lens 20 also includes a lens 40 that is formed by injecting a lens manufacturing clean resin onto an upper surface of the film 30. In one embodiment, the hidden lighting film lens 20, as described below, may further include a bezel 50 that covers one portion of the film 30 or the lens 40.

As illustrated in FIG. 1, the lens 40 of the hidden lighting film lens 20 includes atop portion 41, a vertical sidewall 41*a*, and a flange 42. The sidewall 41*a* is connected to the sides of the top portion 41, by a convex ridge, and the flange 42 is connected to the vertical sidewall 41*a* by a concave ridge.

A hidden lighting lens formation apparatus 1 is configured as a mold 10 for forming the hidden lighting film lens 20 by injection molding.

Specifically, the mold 10 includes a cavity 10A, a core 10B, and first and second nozzles 10C and 10D.

An inner surface of the core 10B has a shape that matches the shape of the surface facing the lens 40, by matching to the top portion 41, the vertical sidewall 41*a*, and the flange 42 of the hidden lighting film lens 20. The cavity 10A has a shape that aligns with one surface of the core 10B in such a manner that the lens 40 having a predetermined thickness is formed by injecting a molten resin composition between the cavity 10A and the core 10B. Specifically, the cavity 10A has a shape that matches the shape of the hidden surface of the film 30, by matching to a top portion 31, a vertical sidewall 31*a*, and a flange 32 of the film 30 of the hidden lighting film lens 20.

In this manner, a cavity convex portion 11*a*, shaped like a Chinese character 凸 and a core concave portion 11*b* shaped like a Chinese character 凹 are formed to match the shapes of the hidden lighting film lens 20 and the film 30. Consequently, the cavity 10A aligns with the core 10B, resulting in the formation of a cavity space 11 inside the cavity 10A.

With regard to the first and second nozzles 10C and 10D, the first nozzle 10C is configured to inject clean resin from the core 10B toward the cavity 10A therethrough, and the second nozzles 10D are configured to inject opaque resin from the core 10B toward the cavity 10A therethrough.

In order to insert-form the film 30 on the hidden lighting film lens 20, before injecting the molten resin composition through the first and second nozzles 10C and 10D, the film 30 is seated on the cavity 10A in the mold 10 by being inserted thereinto.

However, when the film 30 is positioned in the movement-subject cavity 10A, which is a moving component, instead of the core 10B, the film 30 is difficult to be fixed at a regular position thereof during injection molding. Normally, the lens 40 is formed by injection molding at high temperature and pressure, involving such complex shapes as those of a fusion portion, a boss portion, and the like. Thus, there is an increased likelihood that resin will penetrate to a space between the film 30 and the cavity 10A during the injection molding.

In order to address this problem, the hidden lighting lens formation apparatus 1 according to the present disclosure, as illustrated in FIG. 1, includes a film insertion portion 14 and a fixation portion 15 that are formed in the cavity 10A.

As an example, the cavity 10A includes a cavity bottom portion 12, a cavity sidewall 13, and a film insertion portion 14 in such a manner as to form the cavity space 11. The cavity sidewall 13 surrounds the cavity bottom portion 12 that serves as a sidewall. The film insertion portion 14 is a groove carved between the cavity bottom portion 12 and the cavity sidewall 13. As illustrated in FIG. 1, the flange 32 of the film 30 is shaped in such a manner that both end portions thereof are inclined inward, and one part of the inclined end portion can be inserted into the film insertion portion 14. In this case, a position of the film 30 can be readily fixed on the cavity 10A.

As another example, the hidden lighting lens formation apparatus 1 according to the present disclosure may include at least one protrusion 16, as the fixation portion 15, on a surface of the cavity bottom portion 12, and coming into contact with a hidden surface of the film 30. The at least one protrusion 16 serves to fix the position of the film 30 (i.e., a film fixation structure).

The at least one protrusion 16 is formed to protrude toward the core 10B from the cavity bottom portion 12. At least one hole 36 (e.g., a fixation-subject portion) is formed, for example, in the flange 32 of the film 30, and the at least one protrusion 16 on the cavity 10A is inserted into the at least one hole 36 in the film 30. Thus, the cavity 10A, although a resin injection pressure that can push an end portion of the film 30 is applied thereto, can keep the film 30 fixed. Thus, the cavity 10A can operate in such a manner as to prevent the end portion of the film 30 inside the cavity 10A from having an inconsistent shape.

As described above, in many cases, a lens that constitutes a vehicular lamp may include a boss portion 37, which is used for mounting the lens to a vehicle or for other purposes. Therefore, when the protrusion 16 is formed at a position, corresponding to the boss portion 37, on the cavity 10A, there is no need to separately form a hole for inserting the protrusion 16 in the film 30. It is possible to use a hole in the boss portion 37 in place of the hole 36 into which the protrusion 16 is inserted.

As another example, the hidden lighting lens formation apparatus 1 according to the present disclosure may include a film seating rib 17 as the fixation portion 15. The film seating rib 17, as illustrated in FIG. 0.1, is formed to protrude toward the core 10B from the cavity 10A in such a manner as to laterally support both end portions of the film 30 in a state where the film 30 is inserted.

Both lateral portions of the film 30 are supported with the film seating rib 17 in a manner similar to the film insertion portion 14. Thus, the position of the film 30 can be fixed on a surface of the cavity 10A.

As illustrated in FIG. 1, it is desired that the film seating rib 17 protrudes further toward the core 10B than the film 30 in the state where the film 30 is inserted. In this case, a stepped shape may be formed between the film seating rib 17 and the upper surface of the film 30. When resin for forming the lens 40 is inserted after the film 30 is inserted, this stepped shape can prevent the injected resin from penetrating into a space between the surface of the cavity 10A and the hidden surface of the film 30.

In addition, in order to accomplish an effect similar as mentioned above, the cavity 10A, as illustrated in FIG. 1, includes the cavity bottom portion 12 and the cavity sidewall 13. The film 30 is seated on the cavity bottom portion 12. The cavity sidewall 13 forms a periphery of the cavity bottom portion 12. When the film 30 is seated on the cavity bottom portion 12, the cavity sidewall 13 surrounds the vicinity of the film 30. In this case, the cavity sidewall 13 may be configured in such a manner as to have a greater height than the upper surface of the film 30, when viewed from the lateral surface. In this case, a stepped shape is also formed between the cavity sidewall 13 and a surface of the film 30. When the resin for forming the lens 40 is injected after the film 30 is inserted, this stepped shape can prevent the injected resin from penetrating into the space between the surface of the cavity 10A and the hidden surface of the film 30.

Figure 2:
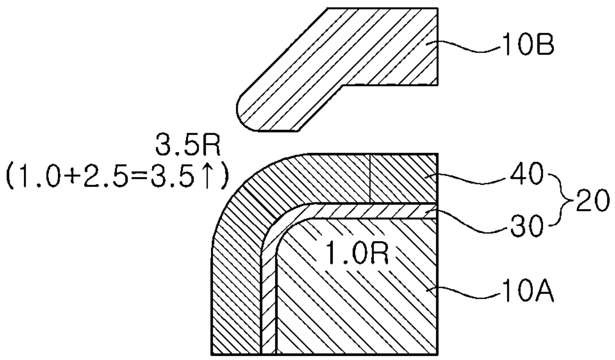
FIG. 2 is a view illustrating an example of a shape of a film according to the present disclosure.
Figure 2:
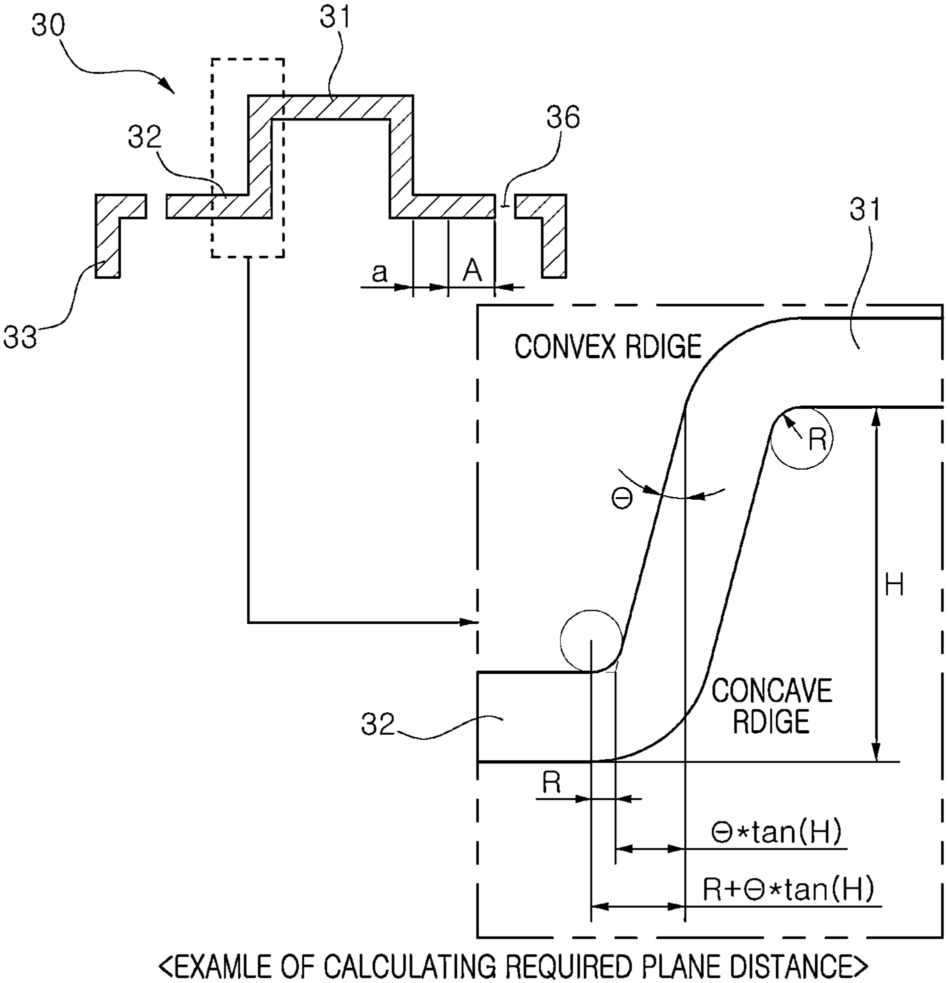
Figure 3:
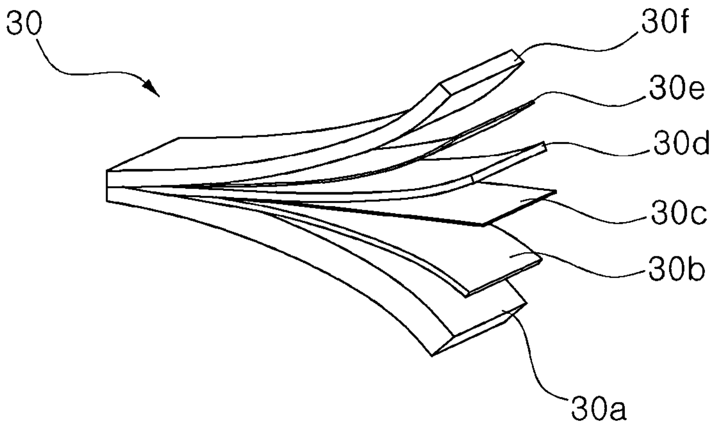
FIG. 3 is a view illustrating a cross-sectional structure of the film according to the present disclosure.

FIGS. 2 and 3 illustrate a detailed structure of the film 30.

With a film lens uniform thickness formation structure of the core 10B and the cavity 10A, which are illustrated in FIG. 2, the uniform thickness of the hidden lighting film lens 20 is ensured through an internal fitting structure of the cavity 10A and the core 10B of the mold 10. Thus, transmissivity deviation can be minimized. Furthermore, facilitation of injection flow can be ensured when injecting resin 100.

To this end, the internal fitting structure forms a round shape on a convex ridge connecting the top portion 31 of the film 30 and the top portion 41 of the lens 40, and a concave ridge connecting the flange 32 of the film 30 and the flange 42 of the lens 40. The round shape, as illustrated in FIG. 2, is formed in such a manner that an outer radius R is greater than a value obtained by adding up the thickness of the top portion 41 of the lens 40 and an inner radius of the round shape. For example, as illustrated in FIG. 2, the thickness of the top portion 41 is 2.5 and the inner radius of the round shape is 1.0, it is desired that the outer radius of the round shape is at least 3.5. By the above-mentioned structure, the uniform thickness of the hidden lighting film lens 20 can be ensured. Thus, the transmissivity deviation can be minimized. Furthermore, the facilitation of injection flow can be ensured when injecting the resin 100.

Respective positions of the protrusion 16 and the hole 36, into which the protrusion 16 is inserted, need a required plane section that indicates a minimum distance to the vertical sidewall 31*a* of the film 30. The protrusion 16 is the fixation portion 15.

With reference to an example of calculating a required plane distance, which is illustrated in FIG. 2, a required plane distance (a) for determining the position of the hole 36 can be calculated using the following Equation 1.

$$\text{Required plane distance } (a) = R + \theta * \tan(H) \quad 1$$

where R depicts an inner radius or an outer radius, as a radius for film lens formation, θ depicts a mold pulling angle (°), and H depicts a maximum height for film lens injection.

When a state where the film 30 is inserted into the cavity 10A is viewed from the lateral surface, a distance between the vertical sidewall 31*a* of the film 30 and the protrusion 16 on the cavity 10A can be set to a value of a or higher that is calculated by Equation 1 for the required plane distance.

The lens 40 is formed of resin that is a transparent material. Thus, in a case where the fixation portion 15 is included in the film 30, there is a concern that the fixation portion 15 is visually exposed to the outside through the lens 40. Therefore, the hidden lighting film lens 20 according to the present disclosure may include the bezel 50 formed of opaque material in such a manner as to cover the vicinity of the positioned lens 40, which corresponds to the fixation portion 15 in the film 30.

Figure 8:
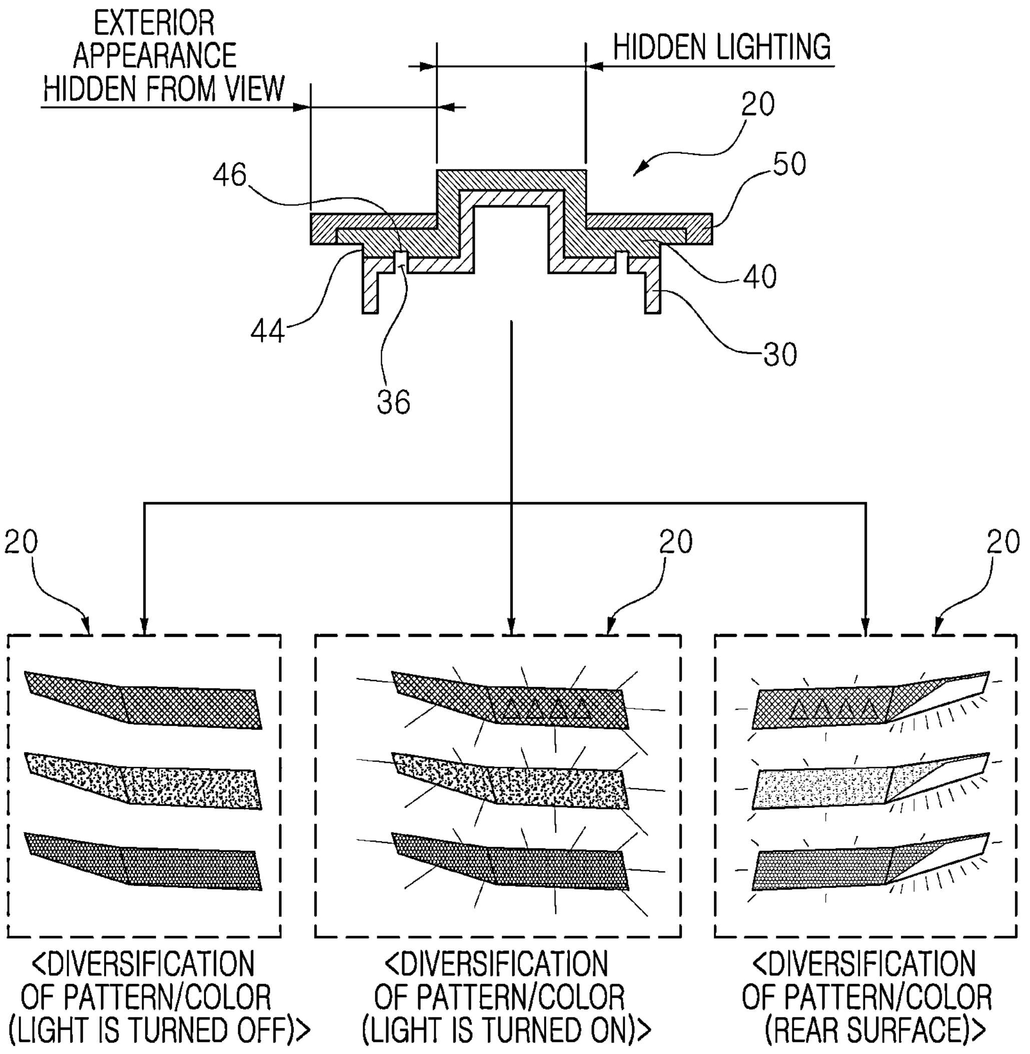
FIG. 8 is a view illustrating various examples of manufacturing a hidden lighting film lens according to the present disclosure.

To this end, the hidden lighting lens formation apparatus 1 may include the second nozzles 10D used for injecting resin that is an opaque material, separately from the first nozzle 10C used for injecting resin that is a transparent material. This setup allows the formation of the bezel 50 at the corresponding position. With regard to the position where the bezel 50 is formed, as illustrated in FIG. 1, the bezel 50 may be formed on a surface of the lens 40 corresponding to the fixation portion 15 in the film 30, or may also be directly formed on the surface of the film 30. In a case where the bezel 50 is formed by directly injecting opaque resin onto the surface of the film 30, and where the hole 36, as described above, is configured as the boss portion 37, there is a need to inject resin (to secondarily inject resin for a concave shape) in a such a manner that a portion of the bezel 50, which corresponds to the hole 36 illustrated in FIG. 8, is concavely formed. In this case, the bezel 50 may be formed using the mold, as is, that is used when resin is primarily injected.

Figure 6:
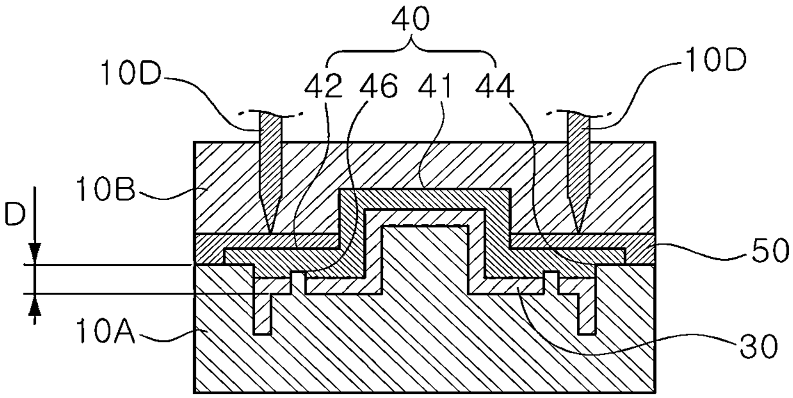
FIG. 6 is a view illustrating examples of secondary resin injection during an injection molding process according to the present disclosure.
Figure 6:
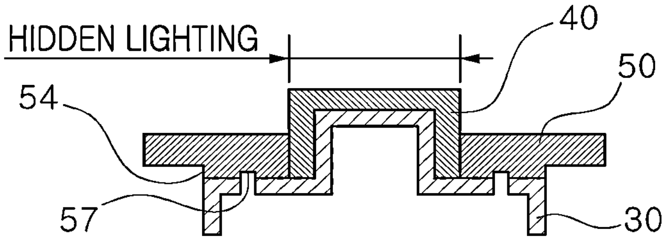
Figure 6:
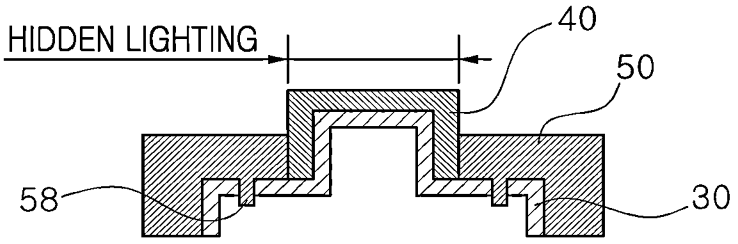

However, the present disclosure is not limited to this formation of the bezel 50. As is the case where resin for a convex shape is secondarily injected as illustrated in FIG. 6, resin may also be injected in such a manner that the portion of the bezel 50, which corresponds to the hole 36, passes through the hole 36. However, in this case, there is a need to inject resin in a mold that is separate from a mold that is used when resin is primarily injected for forming the lens 40, or to partly adjust a position of the cavity 10A in the mold used when the resin is primarily injected.

An example illustrated in FIG. 6 illustrates that the bezel 50 is formed by injecting resin onto the surface of the lens 40 or the surface of the film 30. However, the present disclosure is not limited to this formation of the bezel 50.

Figure 7:
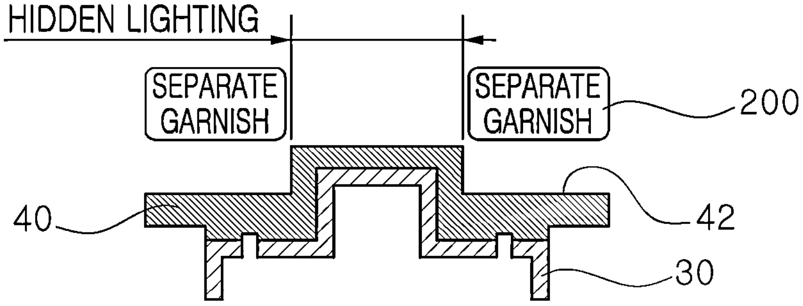
FIG. 7 is a view illustrating examples of a separate garnish or paint application during an injection molding process according to the present disclosure.
Figure 7:
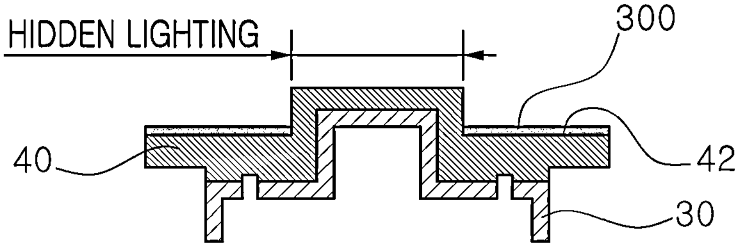

For example, as illustrated in FIG. 7, the bezel 50 may be a separate garnish 200 as a component configured separately from the lens 40. Alternatively, the bezel 50 may be formed by applying opaque paint onto the surface of the lens 40 or the surface of the film 30. In short, as illustrated in FIG. 8, any component that blocks the fixation portion 15 in the film 30 from being visible from the outside may be formed.

FIG. 3 illustrates a detailed structure of the film 30.

With reference to FIG. 3, the film 30 is formed in such a manner as to have a thickness b, using one to six layers 30*a*, 30*b*, 30*c*, 30*d*, 30*e*, and 30*f*. The first layer 30*a*, as a Polyethylene Terephthalate Glycol-Modified (PET-G) sheet, performs a function of ensuring stiffness and maintaining a shape in an enhanced manner. The second layer 30*b*, as a TPU film, functions as a high-frequency formation base that provides suitability for high-frequency conduction formation. One selected from the group consisting of a PET-G sheet, a thermoplastic polyurethane (TPU) film, a hot melt film, and a PMMA film may be applied to the third layer 30*c*, as an insertion layer. The fourth layer 30*d*, as a hot melt film, performs a function of adhesion between a Polymethyl Methacrylate (PMMA) film and a TPU film. The fifth layer 30*e*, as a metalized PET layer, functions as a deposition layer realizing a metal effect, color, and a pattern. The sixth layer 30*f*, as a PMMA film, functions as a film base for ensuring formability and reliability.

Particularly, the fifth layer 30*e* functions as a film layer required for transmissibility deposition for hidden lighting, blocking, color, a pattern, and the like, which are realized by the hidden lighting film lens 20.

FIGS. 4 to 8 illustrate a sequence of steps of a method of forming a hidden lighting film lens, by which the hidden lighting film lens 20 is manufactured.

Figure 4:
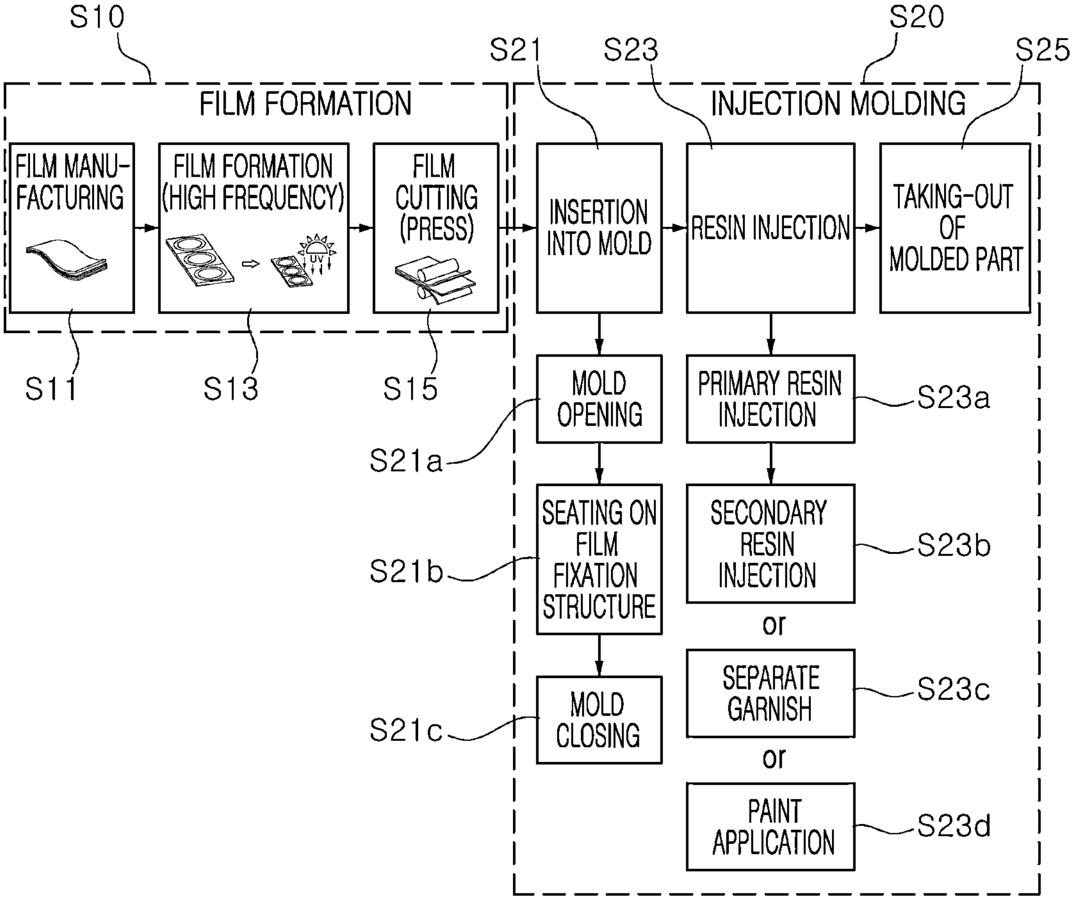
FIG. 4 is a flowchart illustrating a sequence of process steps of a method of forming a hidden lighting film lens according to the present disclosure.

With reference to FIG. 4, the method of forming a hidden lighting film lens is performed by performing a film formation process S10 and an injection molding process S20.

As an example, the film formation process S10 is performed by performing a film manufacturing step S11, a high-frequency film formation step S13, and a press film cutting step S15. In this case, the high-frequency film formation step S13 is a general step of manufacturing a high-frequency film. However, the difference of the high-frequency film formation step S13 from the general step is that the film 30, which is a high-frequency film, includes the one to six layers 30*a*, 30*b*, 30*c*, 30*d*, 30*e*, and 30*f* as illustrated in FIGS. 2 and 3. In addition, the difference is that the top portion 31, the vertical sidewall 31*a*, the flange 32, a film edge portion 33, and the hole 36 are formed during the press film cutting step S15 and that a required plane section A from the end of a required plane distance ($a=R+\theta*\tan(H)$), representing a bent portion, to the hole 36 is thus determined.

As an example, the injection molding process S20 is performed by performing a mold film insertion step S21, a resin injection step S23, and a molded-part take-out step S25. Specifically, the mold film insertion step S21 is performed by a mold opening step S21*a*, a step S21*b* for sitting on a film fixation structure, and a mold closing step S21*c*. The resin injection step S23 may be performed by performing a primary transparent resin injection step S23*a* and a secondary opaque resin injection step S23*b*. Alternatively, the resin injection step S23 may be performed by performing the primary transparent resin injection step S23*a* and a separate opaque garnish manufacturing step S23*c* or a paint application step S23*d*.

Figure 5:
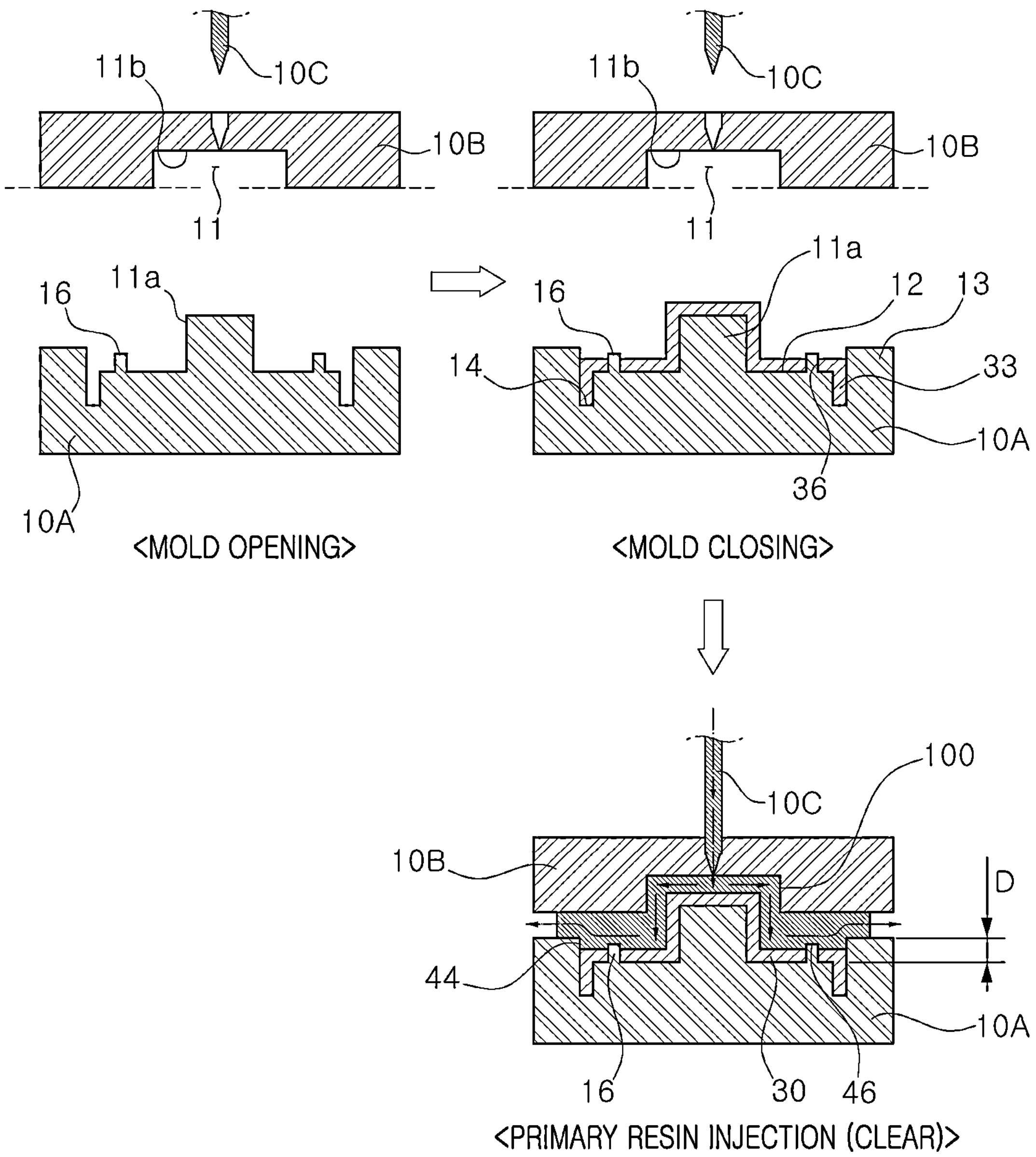
FIG. 5 is a view illustrating examples of film insertion and primary resin injection during an injection molding process according to the present disclosure.

With reference to FIG. 5, in the mold film insertion step S21 of the injection molding process S20, the cavity 10A and the core 10B of the mold 10 are separated and thus a mold opening state is attained (S21*a*). Subsequently, the film 30 is coupled in alignment with the cavity convex portion 11*a*, shaped like the Chinese character 凸, of the cavity 10A, the film insertion portion 14, and the protrusion 16. As a result, the film 30 is in a state of sitting on a film fixation structure (S21*b*). Subsequently, the cavity 10A and the core 10B are coupled to each other, and thus a mold closing state is attained (S21*c*). In this manner, the film setting for manufacturing the light film lens 20 is completed.

With reference to FIG. 5, in the primary transparent resin injection step S23*a* of the injection molding process S20, clean resin 100 is injected through the first nozzle 10C from the core 10B into the cavity 10A in a state where the mold 10 is closed. Thus, the lens 40 is formed by performing the primary transparent resin injection step S23*a*.

With reference to FIG. 6, in the secondary opaque resin injection step S23*b* of the injection molding process S20, after the lens 40 is completely formed, opaque resin (e.g., black-colored resin) 100 is injected through the second nozzle 10D from both left and right-sides of the core 10B into the cavity 10A. Thus, an upper surface of the flange 42 and an edge portion is covered with the black-colored resin 100, except for the top portion 41 of the lens 40. As a result, the bezel 50, serving as an opaque cover that makes up an exterior appearance, is formed.

Therefore, the bezel 50 covers a portion, including a position corresponding to the fixation portion 15, of the lens 40, and functions in such a manner that the uncovered top portion 41 can realize hidden lighting.

Particularly, in the secondary opaque resin injection step S23*b*, the bezel 50 may be formed by secondarily injecting resin for a concave shape or by secondarily injecting resin for a convex shape.

As described above, the hidden lighting film lens 20 according to the present disclosure can be formed through injection molding in a state where the film 30 is inserted, using the hidden lighting lens formation apparatus 1. Therefore, as is the case with deposition for realizing existing hidden lighting and a laser-perforating technique or a deposition-time adjustment half-mirror technique, the hidden lighting film lens 20 according to the present disclosure can be manufactured using an injection molding technique in the related art without an additional process other than injection. Therefore, it is possible to simplify the processes.

In addition, in the case of a manufacturing method in the related art for realizing hidden lighting, an application section is limited according to the size of a laser perforator. In the case of an evaporator equipped with half-cut technology, there is a design restriction in that deposition is required to occur up to a portion that has a different curvature. However, the hidden lighting film lens 20 according to the present disclosure is manufactured by insert-forming a film. The film allows for a high degree of design freedom in its formation. Therefore, the degree of design freedom can be increased when compared with the manufacturing method in the related art for realizing hidden lighting.

In the case of an existing laser perforation technique, a lens with varying curvature is perforated in a two-dimensional pattern. Consequently, the sizes and shapes of the holes are not uniform. Additionally, a material is deposited in predetermined amounts onto portions, having varying curvature, of a half-mirror, which are set at predetermined distances from each other. Thus, deposition thickness differs from one section to another, and a high degree of variation occurs. Consequently, this presents a limitation in achieving uniform transmissivity. However, the hidden lighting film lens 20 according to the present disclosure is manufactured by insert-forming a film. Consequently, uniform thickness and transmissivity can be ensured across all sections with varying curvature.

In addition, various modifications (adjustments of color, a pattern, and a blocking region) can be made to the film, thereby allowing for changes in the vehicle's visual appearance.

As described above, the hidden lighting film lens 20 according to the present disclosure, when inserted into the mold 10 of the hidden lighting lens formation apparatus 1, has a fixation-subject portion that is fixed by the fixation portion 15 provided within the cavity 10A in the mold 10. In other words, in the hidden lighting film lens, the fixation-subject portion may be a hole 36 into which a protrusion formed on the cavity is inserted. Film fixation structures 14, 16, and 17 are formed within the cavity 10A in the mold 10. Thus, a problem that may occur when a position of a film changes can be solved in a case where a lens is formed using a film insert technique.

A stepped shape is formed between the cavity 10A and the inserted film 30. When resin is injected under high pressure in a state where the film 30 is inserted, there is a risk that the injected resin penetrates a space between the film 30 and the cavity 10A, thereby causing the film 30 to peel off. The presence of the stepped shape can solve this problem.

In the above, embodiments of the present disclosure have been described with reference to the accompanying drawings. However, those having ordinary skill in the art to which the present disclosure pertains should understand that various modifications may be made therefrom, and that all or part of the above-described embodiment(s) may be selectively combined. Therefore, the true technical protection scope of the present disclosure should be determined by the technical ideas of the appended claims.

What is claimed is:

1. A hidden lighting lens formation apparatus for manufacturing a hidden lighting film lens having a film for adjusting transmissivity, the apparatus comprising:

a mold including a core, a cavity and a first nozzle; and a film insertion portion formed in a cavity space, wherein a flange of a film inserted into the cavity is positioned and fixed in the film insertion portion, wherein the cavity aligns with a first surface of the core, forming as a space to which a molten resin composition is injected such that a lens having a predetermined thickness is formed between the cavity and the core, wherein the first nozzle is configured to inject the molten resin composition passing through the core, wherein the cavity includes a fixation portion for fixing a position of the film inserted into the cavity, and wherein the fixation portion includes a protrusion that is inserted into a hole formed in the film.

2. The hidden lighting lens formation apparatus of claim 1, wherein the protrusion is formed on a surface of the cavity, in which the film is seated, and the hole is formed in the film.

3. The hidden lighting lens formation apparatus of claim 1, wherein the fixation portion includes a film seating rib that is formed to protrude toward the core from the cavity in such a manner to laterally support both end portions of the film based on the film being inserted.

4. The hidden lighting lens formation apparatus of claim 3, wherein the film seating rib protrudes further toward the core than the film based on the film being inserted.

5. The hidden lighting lens formation apparatus of claim 1, wherein the film insertion portion is formed between a cavity sidewall and a cavity bottom portion that form the cavity space, wherein an end portion of the film is inserted into the film insertion portion based on the film being inserted.

6. The hidden lighting lens formation apparatus of claim 1, wherein the cavity comprises:

a cavity bottom portion on which the film is seated; and a cavity sidewall forming a periphery of the cavity bottom portion and surrounding a vicinity of the film when the film is seated on the cavity bottom portion, wherein the cavity sidewall is configured in such a manner as to have a greater height than an upper surface of the film, based on a view from a lateral surface, thereby forming a stepped shape between the cavity sidewall and the film.

7. The hidden lighting lens formation apparatus of claim 1, wherein the core further comprises:

at least one second nozzle configured to inject opaque resin such as to form a bezel at a position where a surface of the lens corresponding to at least the fixation portion is covered based on a state where the hidden lighting film lens is mounted to a vehicle being viewed from an outside.

8. The hidden lighting lens formation apparatus of claim 1, wherein the hidden lighting film lens comprises:

a top portion:

a convex ridge provided to be connected to sides of the top portion;

a vertical sidewall extending from the convex ridge;

a concave ridge connected to the vertical sidewall; and a flange extending from the concave ridge, and wherein the cavity has a shape that matches a shape of a hidden surface facing the film, the shape matching: the top portion, the convex ridge, the vertical sidewall, the concave ridge, and the flange of the hidden lighting film lens.

9. The hidden lighting lens formation apparatus of claim 8, wherein the hole is formed in the flange of the film, and wherein based on a state where the film is inserted into the cavity being viewed from a lateral surface, a distance between the vertical sidewall of the film and the protrusion on the film is set to a value of a or higher that is calculated by $a=R1+\theta*\tan(H)$, where R1 depicts a value of an inner radius of a convex ridge of the film, θ depicts a mold pulling angle (°), and H depicts a maximum height for film injection.

10. The hidden lighting lens formation apparatus of claim 8, wherein the core and the cavity are formed in such a manner that a value of R2 of an outer radius of the convex ridge of the hidden lighting film lens is equal to or greater than a value obtained by adding up a thickness of the lens in the top portion and a value of R1 of an inner radius of the convex ridge of the hidden lighting film lens.

* * * * *